United States Patent
Hill et al.

(10) Patent No.: US 10,354,442 B2
(45) Date of Patent: Jul. 16, 2019

(54) GENERATIVE MODELING FRAMEWORK FOR DEFERRED GEOMETRY GENERATION

(71) Applicant: Autodesk, Inc., San Rafael, CA (US)

(72) Inventors: Kenneth Jamieson Hill, South Lyon, MI (US); Patricia Anne Vrobel, Portland, OR (US)

(73) Assignee: Autodesk Inc., San Rafael, CA (US)

( * ) Notice: Subject to any disclaimer, the term of this patent is extended or adjusted under 35 U.S.C. 154(b) by 1162 days.

(21) Appl. No.: 14/539,167

(22) Filed: Nov. 12, 2014

(65) Prior Publication Data

US 2016/0133049 A1 May 12, 2016

(51) Int. Cl.
*G06T 17/10* (2006.01)
*G05B 19/4099* (2006.01)
*G06T 19/20* (2011.01)

(52) U.S. Cl.
CPC .......... *G06T 17/10* (2013.01); *G05B 19/4099* (2013.01); *G06T 19/20* (2013.01); *G05B 2219/49023* (2013.01); *G06T 2219/2021* (2013.01); *Y02P 90/265* (2015.11)

(58) Field of Classification Search
None
See application file for complete search history.

(56) References Cited

U.S. PATENT DOCUMENTS

| | | | | |
|---|---|---|---|---|
| 6,124,864 A | * | 9/2000 | Madden | G06T 17/00 345/420 |
| 2005/0168461 A1 | * | 8/2005 | Acosta | G06T 15/08 345/419 |
| 2006/0075718 A1 | * | 4/2006 | Borne | G06Q 10/06 52/745.02 |
| 2007/0013690 A1 | * | 1/2007 | Grimaud | G06T 19/00 345/419 |

(Continued)

OTHER PUBLICATIONS

*Boundary Representation*. Wikipedia. Last modified on Apr. 21, 2013. Retrieved on Jun. 30, 2014. Retrieved from the Internet: URL<http://en.wikipedia.org/wiki/Boundary_representation>. 4 pages.

(Continued)

*Primary Examiner* — Tuan C Dao
(74) *Attorney, Agent, or Firm* — Fish & Richardson P.C.

(57) ABSTRACT

Methods, systems, and apparatus, including medium-encoded computer program products, for a generative modeling framework for deferred geometry generation include, in one aspect, a method including: obtaining input to define a boundary of a 3D envelope for a 3D model of an object, wherein the 3D model uses one or more boundary representations to define the object in the 3D model; identifying a geometry type for the 3D envelope, wherein the geometry type has an associated 3D geometry used to create geometry details for the 3D envelope within the 3D model; manipulating the 3D model in response to input that changes at least one aspect of the 3D envelope; and rendering the 3D model (Continued)

on a display screen, including rendering a simplified representation of the 3D geometry within the changed 3D envelope. In addition, the method can include later generation of surface elements defining the geometry details.

21 Claims, 11 Drawing Sheets

(56) References Cited

U.S. PATENT DOCUMENTS

| | | | | |
|---|---|---|---|---|
| 2011/0190774 | A1* | 8/2011 | Nikolchev | A61B 17/56 606/90 |
| 2013/0001834 | A1* | 1/2013 | El-Siblani | B29C 67/0062 264/401 |
| 2013/0264749 | A1* | 10/2013 | Jones | G06F 17/50 264/497 |
| 2013/0297059 | A1* | 11/2013 | Grifith | B29C 67/0088 700/98 |
| 2013/0300740 | A1* | 11/2013 | Snyder | G06F 3/016 345/420 |
| 2015/0065868 | A1* | 3/2015 | Liang | A61B 1/31 600/425 |
| 2016/0374431 | A1* | 12/2016 | Tow | B33Y 30/00 36/43 |

OTHER PUBLICATIONS

*File: 12-14-hedral honeycomb.png.* Wikimedia. Last modified on Jan. 22, 2014. Retrieved on Oct. 27, 2014. Retrieved from the Internet: URL<http://commons.wikimedia.org/wiki/File:12-14-hedral_honeycomb.png>. 3 pages.

Tseng, M. et al. *A Framework of Virtual Design for Product Customization.* Proceedings of the IEEE Symposium on Emerging Technologies & Factory Automation (ETFA), Sep. 1997. 8 pages.

*Wearie-Phelan Bubbles.* Steel Pillow. Last modified on Feb. 18, 2006. Retrieved on Oct. 27, 2014. Retrieved from the Internet: URL<http://www.steelpillow.com/polyhedra/wp/wp.htm>. 2 pages.

* cited by examiner

GENERATIVE MODELING FRAMEWORK FOR DEFERRED GEOMETRY GENERATION

BACKGROUND

This specification relates to three dimensional (3D) modeling programs, such as computer-aided design (CAD) applications used with 3D printing.

CAD software has been developed and used to generate two dimensional (2D) and 3D representations of objects. Such 3D representations of objects have employed various modeling techniques to represent the 3D object. For example, boundary representation (B-rep) is a technique for representing shapes using the limits, where a solid is represented as a collection of connected surface elements corresponding to the boundary between solid and non-solid. Moreover, such CAD software has been used to generate such models for use in 3D printing, where the CAD software provides a set of tools through which a user can specify geometry details modelled using B-reps.

SUMMARY

This specification describes technologies relating to 3D modeling programs, such as CAD applications used with 3D printing.

When generating a model using a 3D modeling program, it may be desirable to defer generation of some of the geometry in the model while still being able to work with the model as a whole, including a simplified representation of the geometry to be generated later. For example, some generated geometry that is interesting for additive manufacturing is too complex for many traditional modeling techniques including B-reps. An example of such complex geometry would be lattices, which can be structures created with potentially thousands of intersecting struts (or beams). Such complex geometry may be introduced for various reasons, including (1) reducing weight while retaining strength properties, (2) aesthetic purposes, (3) reducing materials cost, (4) reducing manufacturing time, (5) functional reasons (e.g., building structures that more easily bind to bone), or a combination of these. In some cases, such complex geometry need not be modified or generated locally at the computer running a 3D modeling program for the user to continue designing and manipulating the 3D model.

In addition, a generative modeling framework can be provided to handle generation of such complex geometries. Thus, the shape (and other model aspects) can be generated by the computer through algorithmic means based on context. Such generative models can handle complexity that a human user could not easily (or at all) duplicate through the geometry defining tools of traditional CAD software. Thus, a B-rep modeler can provide tools for a user to define some parts of the geometry of a 3D model and also provide a generative modeling framework through which more complex and involved 3D geometries can be generated automatically.

In general, one or more aspects of the subject matter described in this specification can be embodied in one or more methods that include obtaining input to define a boundary of a three dimensional envelope for a three dimensional (3D) model of an object, wherein the 3D model uses one or more boundary representations to define the object in the 3D model; identifying a geometry type for the three dimensional envelope, wherein the geometry type has an associated three dimensional geometry used to create geometry details for the three dimensional envelope within the 3D model; manipulating the 3D model in response to input that changes at least one aspect of the three dimensional envelope; and rendering the 3D model on a display screen, including rendering a simplified representation of the three dimensional geometry within the changed three dimensional envelope. Other embodiments of this aspect include corresponding systems, apparatus, and computer program products.

The 3D model can include a collection of surface elements that define at least a portion of the object, and the method can include: receiving further input indicating the geometry details for the three dimensional envelope should be created; and generating, in response to the further input, surface elements defining the geometry details for the three dimensional envelope in accordance with the three dimensional geometry. The method can include storing the 3D model, including one or more parameters useable to regenerate the geometry details, without storing the surface elements defining the geometry details for the three dimensional envelope.

Further, identifying the geometry type can include receiving a selection of a registered geometry generator, and generating the surface elements defining the geometry details can include calling the registered geometry generator to generate the surface elements defining the geometry details. The method can include notifying the registered geometry generator of changes with respect to the three dimensional envelope. The registered geometry generator can provide an indication of whether the registered geometry generator can apply a deformation within the three dimensional envelope. In addition, the method can include: deforming the boundary of the three dimensional envelope by an inverse of a deformation to be applied within the three dimensional envelope; sending the inverse deformed boundary to the registered geometry generator; receiving from the registered geometry generator the surface elements defining the geometry details within the inverse deformed boundary; and deforming the surface elements defining the geometry details within the inverse deformed boundary by the deformation.

Generating the surface elements defining the geometry details can include employing cell-based generation, and the three dimensional geometry can include one or more primitives that interlock when repeated to fill a region. At least a portion of cells of a cell type can be handled differently during the cell-based generation, including generating interlocking primitive instances that are each different from each other for the at least a portion of the cells of the cell type. The simplified representation of the three dimensional geometry can include a graph representing an association of interlocking primitives, wherein a node in the graph represents a primitive instance, including position and orientation information for the primitive instance, and an edge between the node and another node in the graph represents a connection between respective primitive instances. Furthermore, rendering the simplified representation can include creating a visual display based on the three dimensional envelope to provide visual feedback regarding the simplified representation of the three dimensional geometry within the changed three dimensional envelope.

The method can include outputting the 3D model, including the surface elements defining the geometry details, to a three dimensional printer for printing. Other manufacturing techniques can also be used, as well as other processes (e.g., structural analysis). The three dimensional geometry can include a lattice including a set of junctions and a set of beams connecting the junctions. In addition, the method can include receiving modifying data to be applied to one or more of the junctions, one or more of the beams, or both, during the generating.

One or more aspects of the subject matter described in this specification can also be embodied in one or more systems that include a non-transitory storage medium having instructions of a three dimensional (3D) modeling program stored thereon; and one or more data processing apparatus configured to run the instructions of the 3D modeling program to (i) receive a registration of a geometry generator, (ii) obtain input defining a 3D model and a three dimensional envelope associated with the 3D model and with the geometry generator, and (iii) use the geometry generator to create geometry details for the three dimensional envelope after creation and manipulation of the 3D model with the associated three dimensional envelope. Other embodiments of this aspect include corresponding apparatus, methods, and computer program products.

The one or more data processing apparatus can be configured to run the instructions of the 3D modeling program to create an accurate representation of a combination of the 3D model and the geometry details generated for the three dimensional envelope for provision to a 3D printer. Other manufacturing techniques can also be used, as well as other processes (e.g., structural analysis). The one or more data processing apparatus can be configured to run the instructions of the 3D modeling program to store the 3D model and parameters useable to regenerate the geometry details using the geometry generator, without storing surface elements defining the geometry details for the three dimensional envelope.

The geometry generator can provide an indication of whether the geometry generator can apply a deformation within the three dimensional envelope. Moreover, the framework can also provide deformation capabilities. The one or more data processing apparatus can be configured to run the instructions of the 3D modeling program to deform the boundary of the three dimensional envelope by an inverse of a deformation to be applied within the three dimensional envelope, send the inverse deformed boundary to the geometry generator, receive from the geometry generator the surface elements defining the geometry details within the inverse deformed boundary, and deform the surface elements defining the geometry details within the inverse deformed boundary by the deformation.

The geometry generator can be one of multiple geometry generators available in the system. At least one of the multiple geometry generators can employ cell-based generation. At least one of the multiple geometry generators can employ lattice-based generation. Moreover, the geometry generator can employ cell-based generation, and cells can be defined by the geometry generator in a library of cell configurations.

Particular embodiments of the subject matter described in this specification can be implemented to realize one or more of the following advantages. Complex geometry can be handled within a 3D modeling program as a unit, such that the traditional modeling paradigm (e.g., B-rep) can be side stepped (at least temporarily) to speed up operations on the geometry, facilitating the user's design and management of a 3D model. A generative modeling framework can allow different geometry generators to register with the framework and then be responsible for generating the complex geometry details. A user can specify an envelope of the model in which the generated geometry is to be placed, and operation to modify the envelope can be allowed before the geometry is generated and placed therein. The envelope can be associated with a registered geometry generation program that handled generating geometry details to fill the envelope. Moreover, as the envelope is modified by traditional modeling operations, the geometry can be regenerated within the envelope. In some implementations, graphics hardware can be effectively leveraged for rendering very complex but repetitive geometry. Moreover, functions that deform the generated geometry en masse can be applied to further control the aesthetics or function of the generated geometry.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
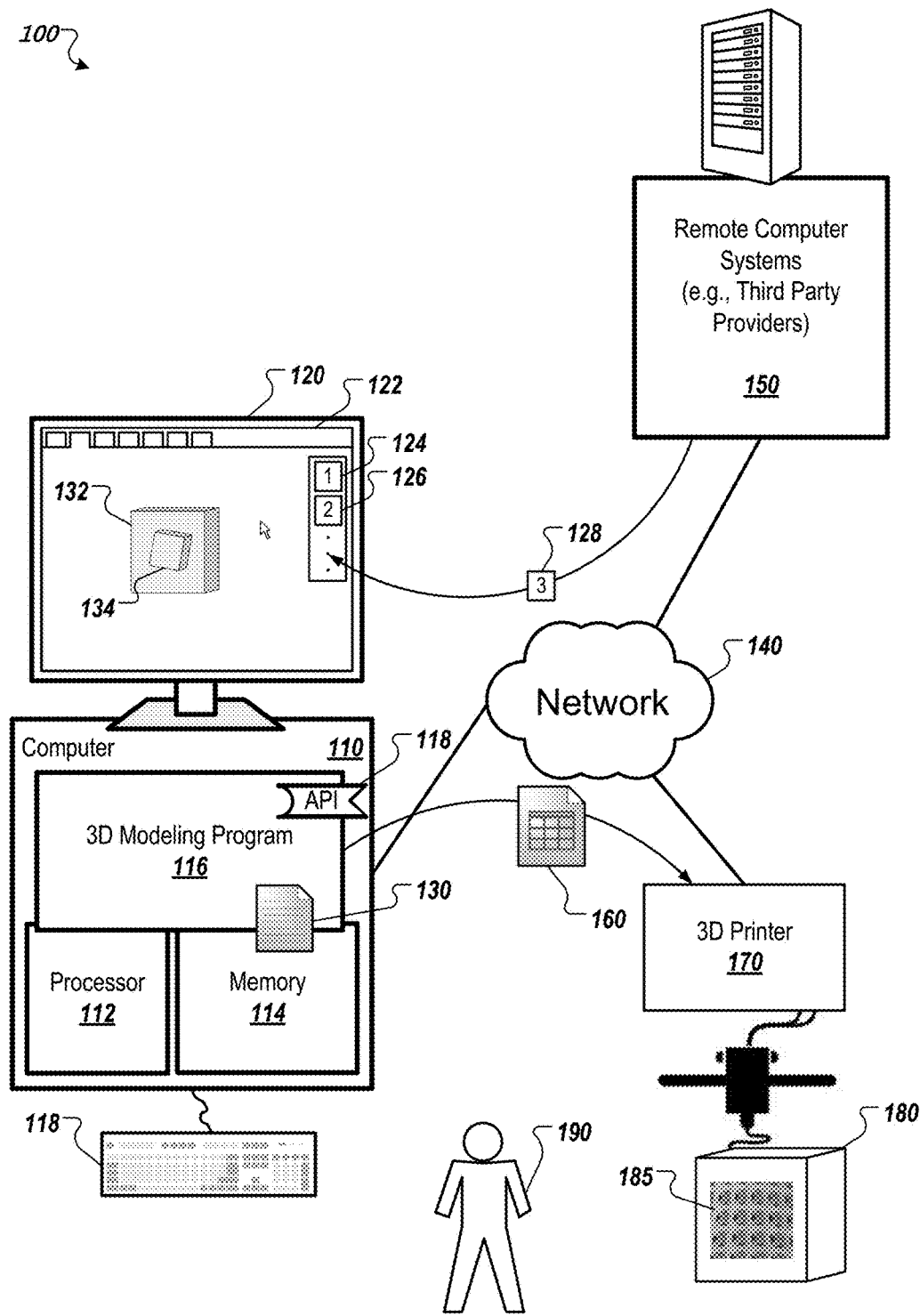
FIG. 1 shows an example of a system that provides a three dimensional (3D) modeling framework with deferred geometry generation.

FIG. 1 shows an example of a system 100 that provides a three dimensional (3D) modeling framework with deferred geometry generation. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112.

Such programs can include a 3D modeling program 116, which can run locally on computer 110 or remotely on a computer of one or more remote computer systems 150 (e.g., in a server system accessible by the computer 110 via the network 140). The 3D modeling program 116 presents a user interface (UI) 122 on a display 120 of the computer 110, which can be operated using one or more input devices 118 of the computer 110 (e.g., keyboard and mouse). Note that while shown as separate devices in FIG. 1, the display 120 and/or input devices 118 can also be integrated with each other and/or with the computer 110, such as in a tablet computer.

A user 190 can interact with the 3D modeling program 116 to create a 3D model 132, e.g., a boundary representation model of a solid object. This can be done using known graphical user interface tools. In addition, the UI 122 of the program 116 can allow the user 190 to provide input defining a three dimensional envelope 134 associated with the 3D model 132 and further associate a geometry generator from a set of available geometry generators 124, 126. After this association of a the envelope 134 with a geometry generator (e.g., generator 126), the user 190 can continue to manipulate the 3D model 132 while a simplified representation of the geometry details is used to generate a visual display (e.g., a lower resolution version of the geometry without all connections precisely defined) shown for the envelope 134 without actually generating and incorporating those details into the primary model (e.g., incorporated as part of the B-rep).

The manipulation of the 3D model 132 can include adding, deleting, or changing components of the model 132, including components that intersect with the envelope 134, and also changing the definition of the envelope 134 itself. For example, a boundary of the envelope 134 can be resized, rotated, translated, or otherwise modified in manners similar to a traditional B-rep, but since generation of the full geometry details that depend on the changes to the envelope 134 is deferred, the processing time that would otherwise be needed to propagate those changes through all the geometry details can be avoided. Thus, generating representative data for display can happen immediately, while generating geometry details for creating a manufacturable solid does not.

Once the user 190 is satisfied (at least temporarily) with the model 132, the associated geometry generator (e.g., generator 126) can be used to create the full geometry details for the envelope 134, and those geometry details can be integrated with the rest of the 3D model 132, such as by modifying a B-rep of the model 132 to include the generated geometry details or by generating another representation of the model (e.g., an .STL file for 3D printing) that combines the 3D model 132 and the geometry details generated for the envelope 134. This can be done upon request by the user 190 to generate the details, or in light of the user's request for another action, such as sending the 3D model 132 to a 3D printer 170 (which can be directly connected to the computer 110, or connected via a network 140, as shown). This can involve a post-process carried out on the local computer 110 or a cloud service to export the 3D model 132 to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files.

In any case, the 3D modeling program 116 can create an accurate representation of a combination of the 3D model 132 and the geometry details generated for the three dimensional envelope 134, and provide a document 160 (of an appropriate format) to the 3D printer 170 to print a complete structure 180, including detail geometry structures 185. In addition, the user 190 can save or transmit the 3D model 132, either with or without the geometry details, for later use. For example, the 3D modeling program 116 can store a document 130 that includes the 3D model 132 and parameters useable to regenerate the geometry details using the geometry generator associated with the envelope 134, without storing surface elements of the geometry details generated previously by the geometry generator.

The geometry generators useable through the UI 122 can be generators that are predefined by the 3D modeling program 116, generators that are added in the course of use of the 3D modeling program 116, or both. For example, the 3D modeling program 116 can include a first geometry generator 124 and a second geometry generator 126 that come prepackaged with the 3D modeling program 116, and the 3D modeling program 116 can also include an interface through which a registration of a geometry generator can be received. Thus, one or more additional geometry generators 128 can be added over time, including one or more additional geometry generators 128 from third party providers 150. This provides additional flexibility for the user 190, allowing the 3D modeling program 116 to grow in functionality and provide a facility through which a market in detailed geometry components can grow.

The 3D modeling program 116 can provide an application programming interface (API) 118 through which third party providers 150 can register and interface their geometry generator programs with the 3D modeling program 116. The API 118 can define how parameters are passed from the program 116 to a generator 128, as well as how the generator 128 can pass information to the program 116. For example, in some implementations, a registered geometry generator 128 can provide an indication to the program 116 of whether the generator 128 can apply a deformation within the three dimensional envelope 134 or whether the program 116 itself should handle a deformation within the three dimensional envelope 134.

In addition, the program 116, a third party generator 128, or both can employ cell-based generation of geometry details, lattice-based generation of geometry details, or both. In cell-based generation, the surface elements defining the geometry details can be generated using one or more primitives that interlock when repeated to fill the envelope 134, or the surface elements can be created by the generator 128 in the cell instances (e.g., using a cell graph) using other approaches. In lattice-based generation, the geometry details can be built using a set of junctions and a set of beams connecting the junctions. Such cell primitives and lattice junctions and beams can be predefined by the program 116 (e.g., in a library associated with the program 116) and/or be definable through the API 118. For example, in some implementations, the API 118 can include one or more interfaces that allow a geometry generator 128 to define one or more primitives for cell-based generation. This can include definition of names for different cell types that fit together, along with definitions for different sides of the cells and how they join together. Thus, the API 118 can be used to add to a library of shape types and rules for combining them.

In some implementations, B-rep region(s) to be filled and deformation parameters are directly available to the generator 128. In some implementations, the generator 128 can be responsible for modifying the model, adding scene features, and creating portions of the document for manufacturing. In some implementations, for cellular geometries, the API 118 can include a cellular API, an XML (eXtensible Markup Language) document can be used to describe the cellular structures in terms of connected polyhedrons, the generator can be called upon to operate on each individually, and the API can be responsible for other portions of the full detailed geometry generation.

In some implementations, a generated geometry library is implemented via a definition in an XML document or other document format. A minimum definition (.XML) can specify a bitmap to be displayed when choosing a geometry to fill a region, and a reference to an add-in (e.g., generator 128) that implements the geometry creation. Each add-in can provide a way to visualize its effects in the scene, which can include a Modify( ) callback, a Render( ) callback, and Generate( ) callback. The definition of Modify( ) can specify that an add-in will modify the target 3D model, and an appropriate callback can be made to allow the add-in to change the geometry. In some implementations, the Modify( ) call-back can be used just to let the API know that the region has changed. The Render( ) callback allows the geometry to be rendered in the scene without modifying the 3D model (i.e., a visual display of a simplified representation of the geometry to be created). If the geometry is not modified and no scene rendering is provided, a bitmap can be displayed on the 3D model 132 in the envelope 134 that will receive the generated geometry, where this bitmap may be specified in the XML definition.

The Generate( ) callback of the add-in provides a way to generate the full geometry, which can be combined with the geometry of the primary model 132, e.g., to form a new model in a voxel or tessellated form, for exporting, e.g., such as creating a .STL file 160 for 3D printing, or in some other format 160 for some other purpose, such as structural analysis. Note that the XML definition can specify that the region has a repeated, connected cell structure. In this case, the various callbacks can receive a reference to a cell to operate on, and a graph can be used to indicate connections between cells. This enables the generator to break down its task into more easily managed parts. The cell shapes and the connectivity between cells can also be defined in the XML document. Further details for cell-based generation are provided below in connection with FIGS. 6A, 6B, and 7.

Figure 2:
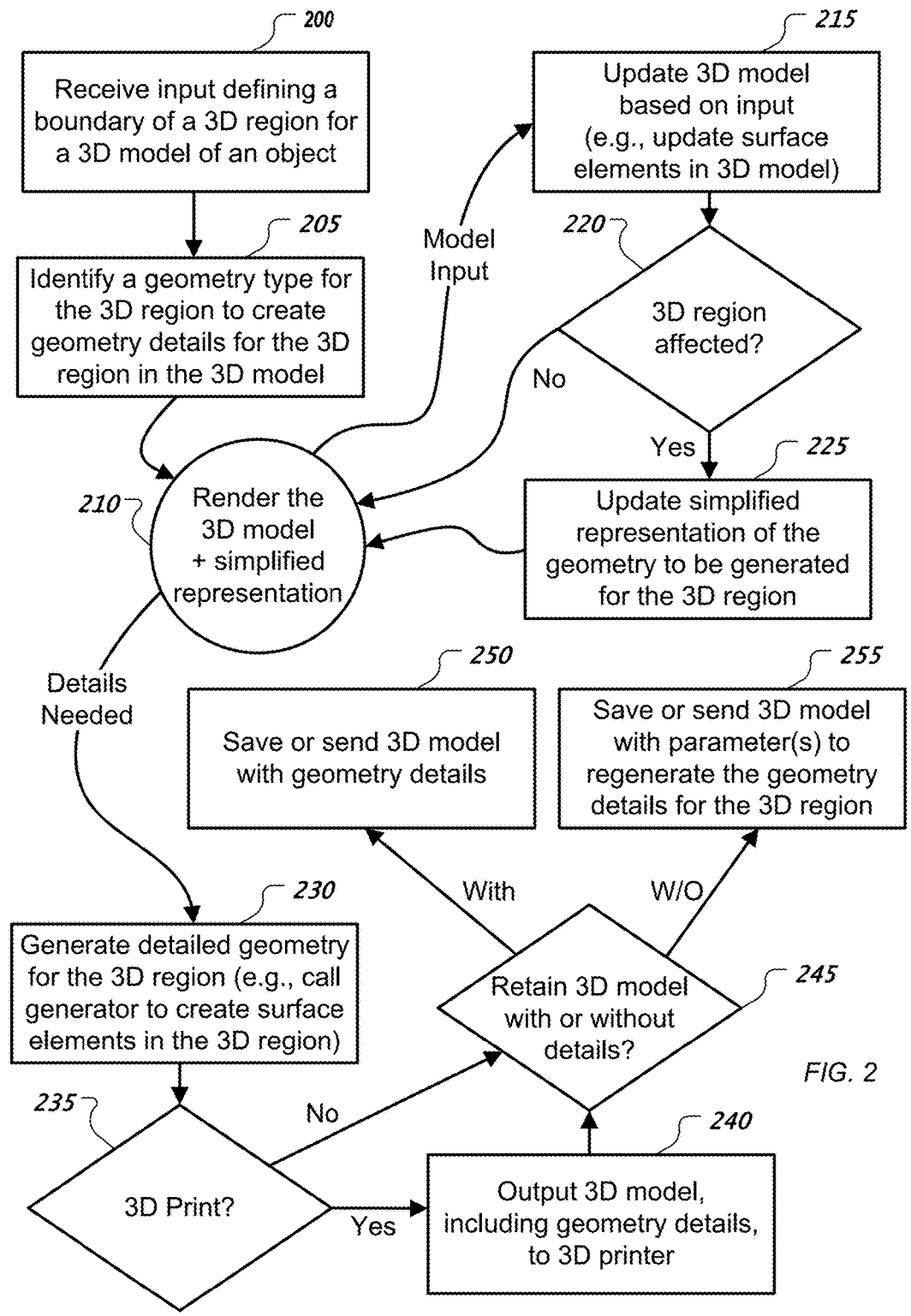
FIG. 2 shows an example of a process of 3D modeling with deferred geometry generation.

FIG. 2 shows an example of a process of 3D modeling with deferred geometry generation. At 200, input is received to define a boundary of a 3D region within a 3D model of an object. For example, the 3D model can use boundary representations (B-reps) to define the object in the 3D model, and a user can define an envelope for detailed geometry to be added later. This can involve selecting bounding faces for a region of space.

At 205, a geometry type for the 3D region is identified, where the geometry type has an associated three dimensional geometry used to create geometry details for the three dimensional region within the 3D model. For example, a user can select a registered geometry generator from a set of available geometry generators, where the geometry generator is programmed to create the associated three dimensional geometry within a region based on parameters passed to it. In some implementations, the user can also select various parameters for the geometry to be generated, such as a scale factor and other parameters that affect its shape. For some complex geometries, additional parameters can be selected by the user that change details within the geometry. For example, for a lattice geometry, the radii of the lattice struts and one or more surfaces with which to align preferred planes of the lattice can be selected, in some implementations. In addition, in some implementations, a lattice can be defined by a set of junctions and a set of beams connecting the junctions, and the parameters can include modifying data to be applied to one or more of the junctions, one or more of the beams, or both, during the generating of the lattice geometry.

At 210, the 3D model is rendered to a display screen, where this rendering includes rendering a simplified representation of the three dimensional geometry. For example, the simplified representation can be data maintained in memory by the 3D modeling program, and the 3D modeling program can create from this data in memory a visual display on the screen for the 3D region to provide the user with visual feedback regarding the three dimensional geometry with respect to the 3D model, without actually incorporating those details into the primary model. In some embodiments, an associated geometry generator handles creation and rendering of the simplified representation, and the 3D modeling program calls the geometry generator to effect the rendering at 210.

While the user sees the visual representation of the 3D model with its not-yet-incorporated detailed geometry, the user can provide input to modify the model, and the 3D model is updated at 215 based on this input. Various types of inputs can be made, including addition, modification, and deletion of portions the 3D model that are fully represented (e.g., surface elements in a B-rep 3D model can be updated). In addition, some model inputs will affect the 3D region, which will be determined at 220. These inputs can include modifications to fully represented parts of the 3D model that intersect with or otherwise interface with the 3D region as well as inputs that directly modify the 3D region, such as inputs to change the boundary of the 3D region or the geometry type (e.g., geometry generator) associated with the 3D region. When such changes occur, the simplified representation of the geometry to be generated for the 3D region can also be updated at 225, before the 3D model is again rendered at 210, including rendering the simplified representation of the three dimensional geometry within the changed three dimensional region (e.g., using the Modify( ) function).

The user can continue to work on the 3D model for an extended period of time, without having the computer spend processing time on the detailed geometry. When the details of the geometry in the 3D region are finally needed, the detailed geometry for the 3D region can be generated at 230. For example, surface elements defining the geometry details in the 3D model can be created by calling a registered geometry generator associated with the 3D region to generate those surface elements. Note that these generated geometry details may or may not be incorporated into the primary model (e.g., added to the B-rep model) depending on the implementation. Moreover, such detailed geometry generation can be triggered by various events, including user selection of an option to generate the detailed geometry or user selection to print the 3D model.

At 235, it is determined whether a 3D print is desired. If so, the 3D model, including the generated geometry details, is output to a 3D printer at 240. At 245, it is determined whether the generated geometry details should be retained with the 3D model. This can be done based on user input or the nature of the operation to be performed (e.g., saving to a disk with limited space, or sending the 3D model over a network connection with limited bandwidth, can automatically trigger dropping of the geometry details). At 250, the 3D model can be saved or sent with the generated geometry details retained. At 255, the 3D model can be saved or sent with one or more parameters useable to regenerate the geometry details, without saving or sending the surface elements defining the geometry details for the 3D region.

Figure 3:
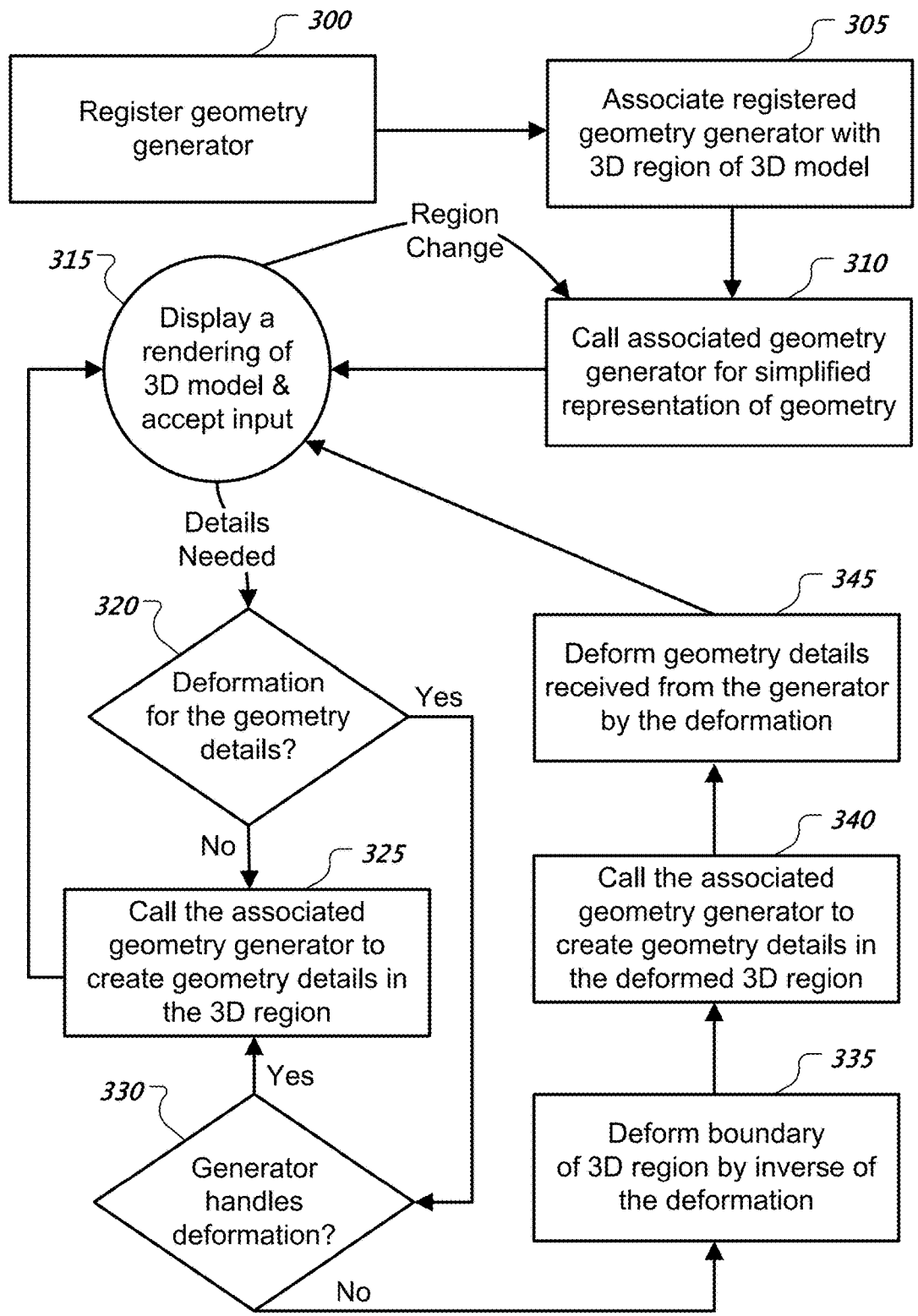
FIG. 3 shows another example of a process of 3D modeling with deferred geometry generation.

FIG. 3 shows another example of a process of 3D modeling with deferred geometry generation. In this example, a geometry generator handles generation of both the geometry details and also a simplified representation of the geometry details before they are fully generated. At 300, a geometry generator is registered with the 3D modeling program. At 305, the registered geometry generator is associated with a 3D region of 3D model, such as described above.

At 310, the associated geometry generator is called to create the simplified representation of the geometry for the 3D region. This can involve sending a boundary definition for the 3D region to the geometry generator and receiving back from the geometry generator a set of surface elements that are a small subset of all the surface elements to be generated later (e.g., a visually representative but incomplete subset of B-rep elements). In some implementations, this can involve generating textured triangles for display using techniques similar to those used in video games. At 315, the 3D modeling program displays a rendering of the 3D model using the information currently available for the 3D region, which at this point in this example is the simplified representation provided by the geometry generator. Further input can be received at 315, and when the 3D region is changed, the geometry generator can be called again. For example, the user can move the visual rendering of the simplified representation within the 3D region to change the position of the geometry details to be generated with respect to the 3D region. Thus, the registered geometry generator can be notified of changes with respect to the 3D region and assist in updating the display before the geometry details are actually generated. Such assistance can also be provided after the geometry details are generated.

When an input indicates that the detailed geometry is needed, a check can be made at 320 as to whether those geometry details need to be deformed in some fashion based on the user's input when creating the 3D model. If not, the associated geometry generator is called at 325 to create the geometry details in the 3D region without deformation and the 3D model is displayed at 315 with the generated geometry details included. If a deformation is needed, an additional check can be performed at 330 as to whether the geometry generator is designed to handle deformation. In some embodiments, the registered geometry generator can provide an indication of whether it can apply a deformation within the 3D region it is supposed to fill with geometry. If the generator can apply the deformation, the generator can be called at 325 with input that defines the desired deformation. Once the output is received from the generator, the 3D model is displayed at 315 with the deformed geometry details included. Note that a deformation function may be defined based on some set of user requirements, or for aesthetic purposes.

If the generator cannot apply the deformation, the 3D modeling program can handle the deformation instead. In this case, the 3D modeling program can automatically deform the boundary of the 3D region at 335 by the inverse of the deformation that is desired for the detailed geometry inside the 3D region. Then, the generator can be called at 340 using the deformed boundary so that it will create the geometry details within the deformed boundary. After sending the inverse deformed boundary to the registered geometry generator, the 3D modeling program will thus receive back from the geometry generator the surface elements defining the geometry details within the inverse deformed boundary.

However, since the geometry generator will not have applied its own deformation, the geometry details will be un-deformed within the deformed 3D region. Thus, at 345, the 3D modeling program deforms the geometry details received from the generator by the deformation to create the deformed version of the geometry details within the original, un-deformed 3D region. This process is further illustrated in FIGS. 4A-4D, which shows the process in two dimensions, but represents the process that occurs in three dimensions.

Figure 4A:
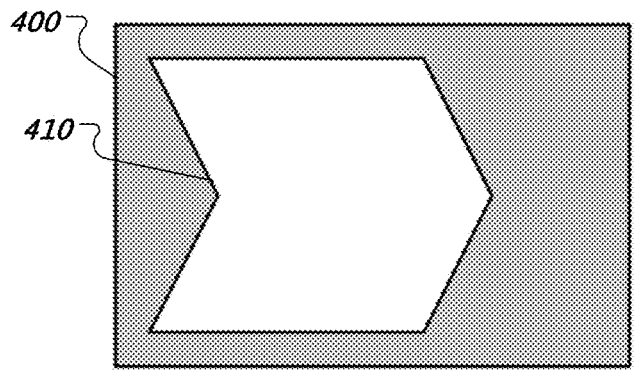
FIGS. 4A-4D show an example of a process of deformation of geometry details.

In FIG. 4A, a 3D model 400 includes boundary representations that define a solid object. In addition, 3D region 410 has been defined for the 3D model 400, where geometry details are to be added by a geometry generator. A deformation for these geometry details is desired, but the geometry generator is not designed to create a deformed version of its geometry type. In the example shown, the geometry type generated is a lattice geometry, but other geometries are also possible.

Figure 4B:
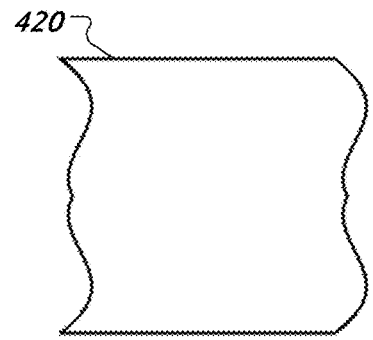
Figure 4D:
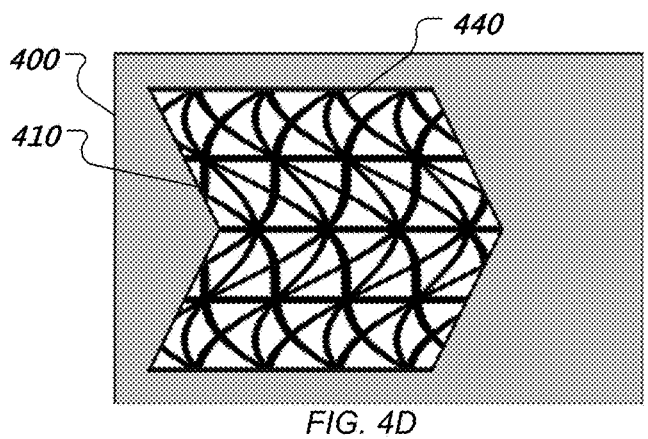
Figure 4C:
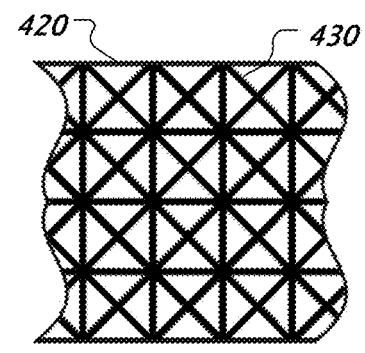

The 3D modeling program extracts the boundary of the region 410 and deforms this boundary by the inverse of the chosen deformation, thus creating a deformed boundary 420, as shown in FIG. 4B. This inverse-deformed boundary 420 is then provided to the geometry generator as the boundary within which to fill geometry details 430, and the generator does so, as shown in FIG. 4C. As shown, the geometry details are un-deformed at this point.

The modeling program then deforms the placed geometry 430. Since the geometry was placed to match the inverse-deformed boundary, it will match the original boundary after the deformation. This is because at the boundary, the operations of inverse-deforming and deforming (by the same function) cancel each other out. The result is then placed back in the 3D model as shown in FIG. 4D. The deformed geometry 440 fits in the original region 410 and yields the desired geometry.

Automatic deformation has the advantage that it is simple for a third party geometry generator. For many types of generated geometry the result may be exactly what is desired. However, automatic deformation may have undesirable consequences. Note that the struts in this deformed lattice 440 curve according to the deformation, and their thickness varies from the un-deformed lattice. If the purpose of the generated geometry is to provide some structural support, these effects may weaken the structure. Thus, the system can be designed to allow the geometry generator to determine whether a deformation should be handled by the framework of the 3D modeling program or by the geometry generator itself.

Figure 4E:
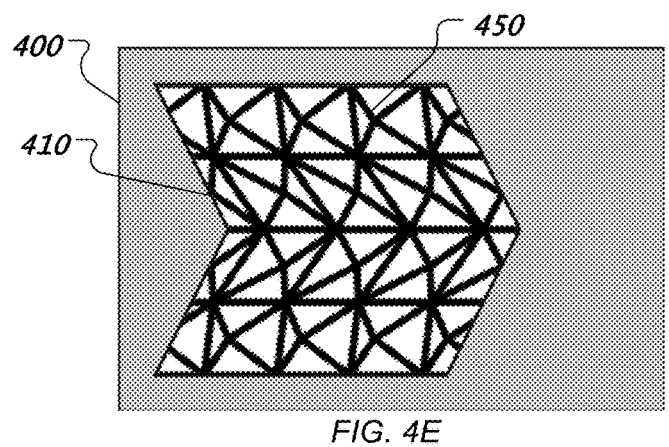
FIG. 4E shows another example of a process of deformation of geometry details.

FIG. 4E shows another example of a process of deformation of geometry details, where the same geometry generator has opted to apply the deformation itself. For example, the generator may simply move the junctions of the lattice according to the deformation function, but leave the struts linear and maintain the original thickness. In this case, the generator gets the original boundary, and is responsible for placing the generated geometry 450 with respect to the deformation. Thus, the generator has customized the deformation for the specifics of the geometry details it generates.

Figure 5A:
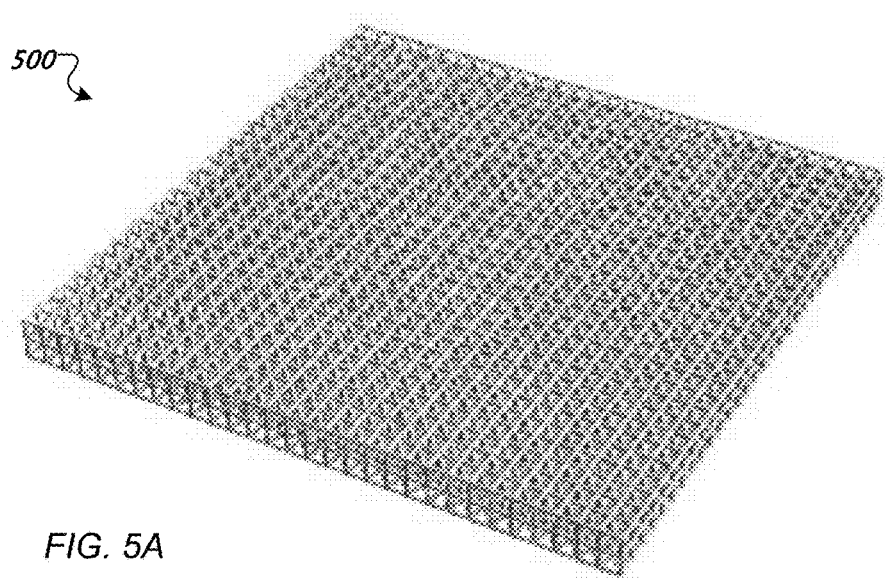
FIGS. 5A-5D show an example of a 3D lattice geometry being deformed and added to a tool.
Figure 5B:
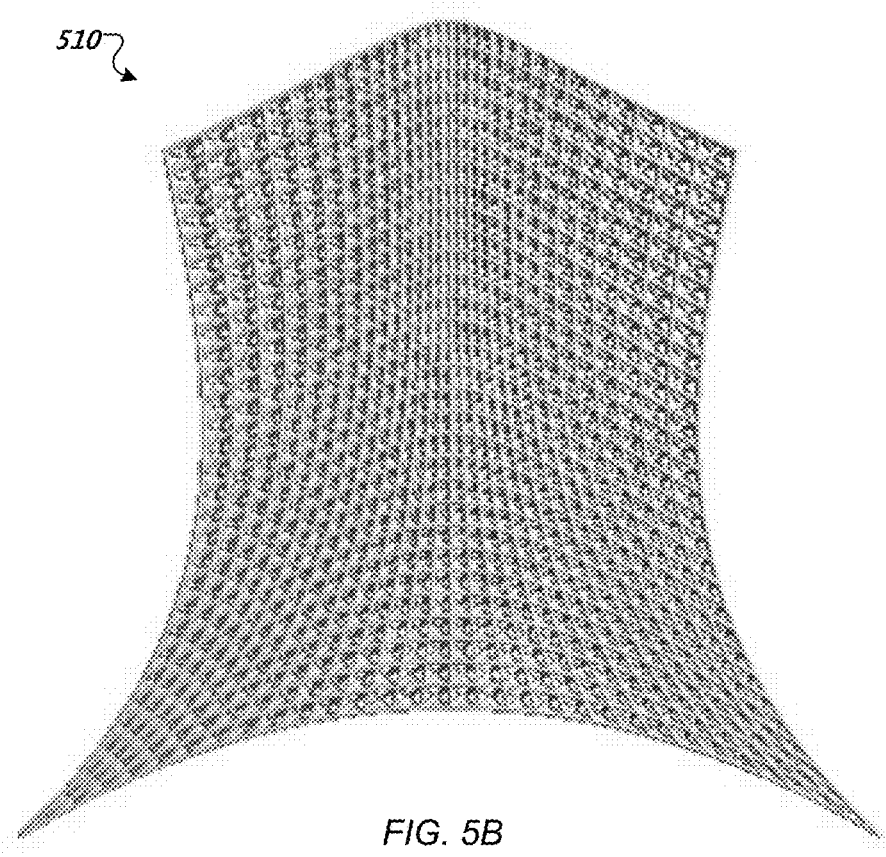
Figure 5C:
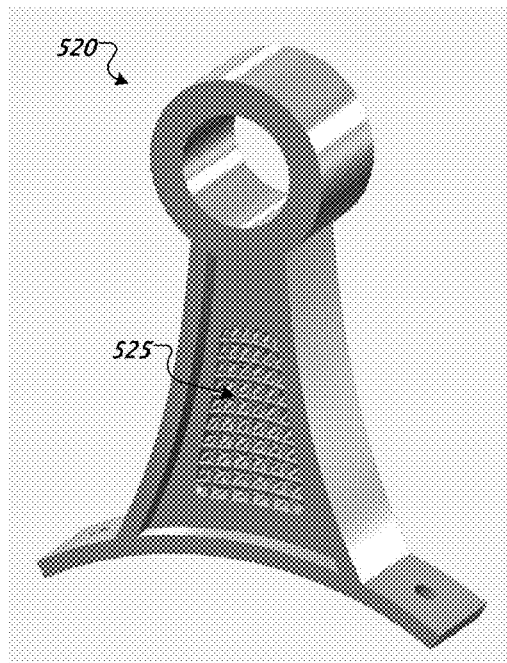

FIGS. 5A-5C show an example of a 3D lattice geometry being deformed. In this example, control vertices for the user are grouped into slices, but other control techniques are also possible, including using skinning and fitting, or other methods to manipulate splines. In general, the user interface of the system can be designed such that, given a lattice (or other generated block of geometry) users can manipulate simple controls to deform the block or cause it to conform to preexisting surfaces in the 3D model.

FIG. 5A shows an undeformed octahedral lattice 500, which represents the generated geometry independent of the region in which it will be placed. FIG. 5B shows a deformed version 510 of the undeformed octahedral lattice 500. For example, the deformation can be applied in preparation for placement in a region. Such deformations can be created in various ways, including automatic deformation by a geometry generator or the framework through which such generators operate with the modelling program, or by user manipulation, such as manipulations of control surfaces provide for the lattice geometry to cause deformation. In addition, other types of deformations, e.g., bending or revolving the geometry around an axis, are also possible.

Figure 5D:
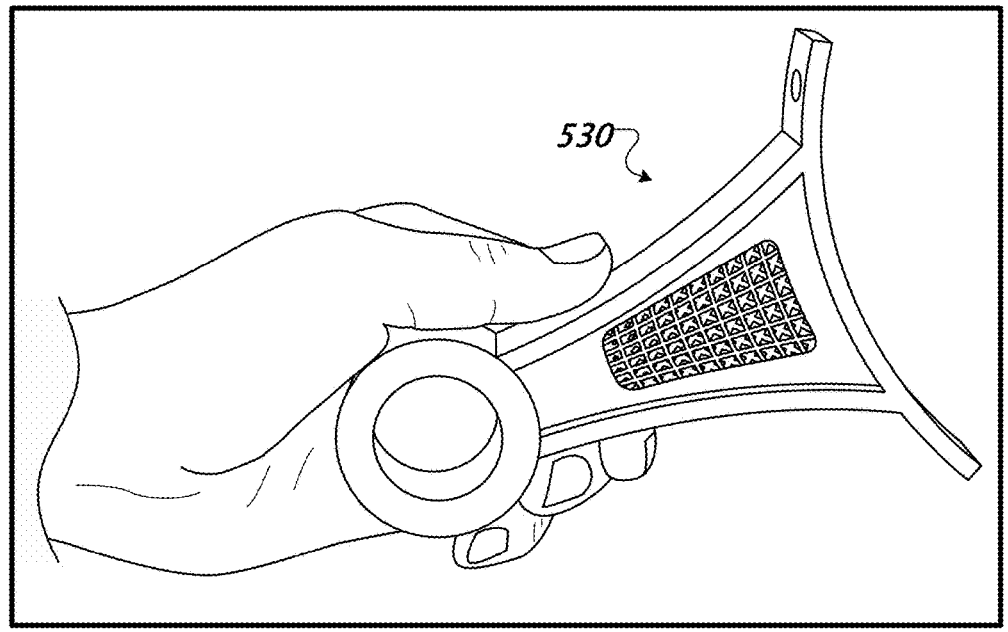

FIG. 5C shows an example of a lattice geometry being added to a tool. As shown, the deformed lattice 510 from FIG. 5A can be used to fill one or more regions of a part 520 to reduce the weight of the part 520 and the cost of the materials used to make the part 520. FIG. 5C shows a 3D rendering of the part 520, in which the deformed lattice 510 is visible in the part in a simplified rendering 525 but is not yet incorporated into the B-rep of the 3D model. FIG. 5D shows the actual printed part 530, in which the generated lattice is realized in physical form. Note that the lattice reduces weight compared with a solid version of the same design while retaining some strength. In addition, the lattice also adds a stylistic element to the design.

Thus, as will be appreciated, complex geometries, such as lattices, can also be used for aesthetic reasons. Various lattices and other complex geometries can be applied to various different 3D models to replace selected solid regions for aesthetic and/or functional reasons, such as to reduce weight while retaining much of the item's strength. Moreover, in some cases, the addition of the complex geometry can increase the strength of the item.

For example, in some implementations, the complex geometry can be a definition for a metal foam. Metal foam is comprised of cellular structures mixing metal with open spaces, similar to a common kitchen sponge. Metal foams may be regular (comprised of identical cells) or irregular. Metal foams are of particular interest for automotive and aerospace applications for their thermal properties and behavior under impact conditions. They are also used in medical applications, particularly for bone-binding sites. Thus, medical devices that are to be implanted in people (e.g., a rod designed to induce bone binding in a hip replacement) can be designed using complex geometries as described herein.

Figure 6A:
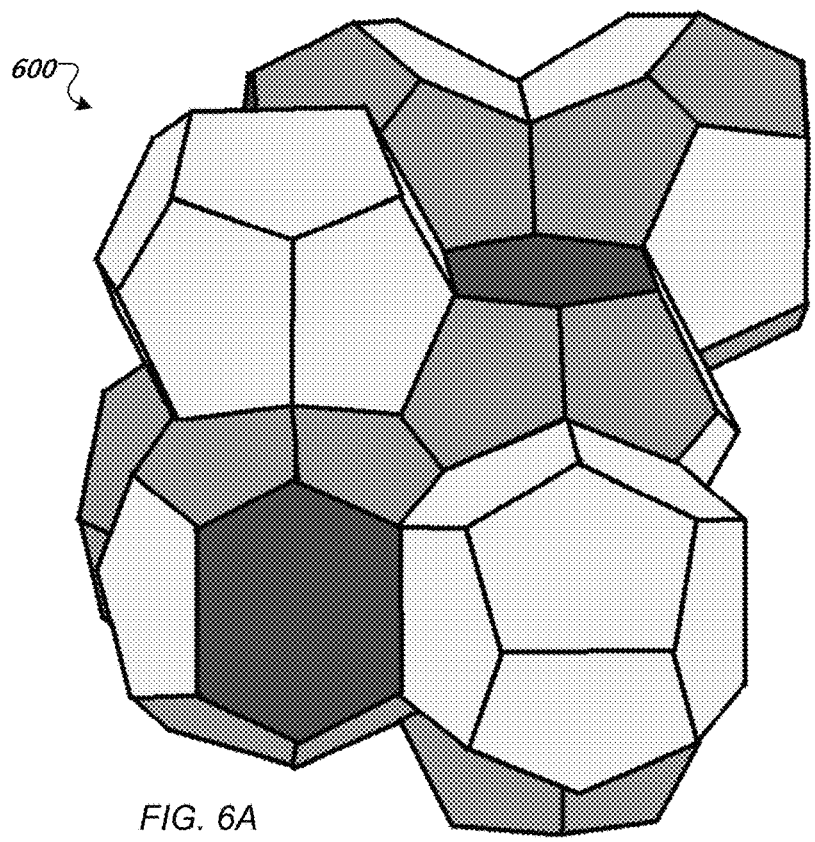
FIG. 6A shows an example of a cell matrix.

FIG. 6A shows an example of a cellular matrix 600. The cellular matrix 600 is represented by eight instances of a polyhedron where different colors are used to represent different face types of the cell primitive (note that the image is merely representative of some number of instances). As noted above, an XML document can be used to describe the cellular structures, but other data formats are also possible. In addition, various types of polyhedrons can be used to fill a space, and different types of cells can be defined for each such polyhedron type. Cell primitives can be predefinable and can come from a library provided by an API of the 3D modeling program. Geometry generators can thus use the API to define their specific geometries, including defining primitive types to have different geometries, defining different sides of a cell, and defining how those sides meet together. In addition, in some implementations, the geometry generators can export cell definitions back into the 3D modeling program through the API. Thus, one or more libraries of shape types and rules for combining them can grow over time.

Figure 6B:
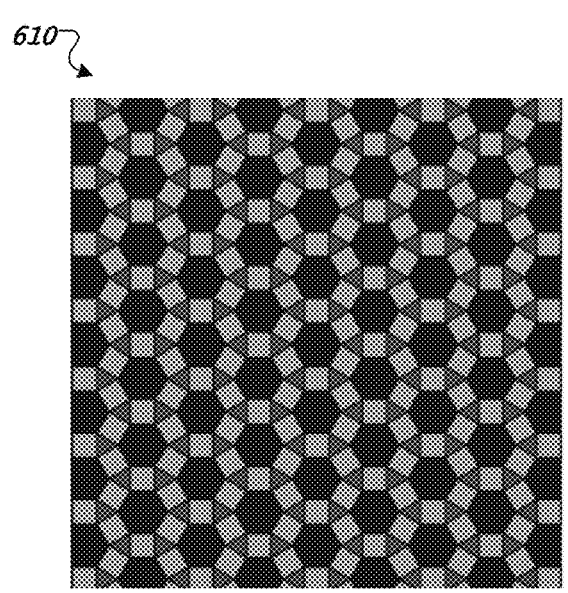
FIGS. 6B-6F show examples of a cell geometry created for a cell matrix represented in two dimensions.
Figure 6C:
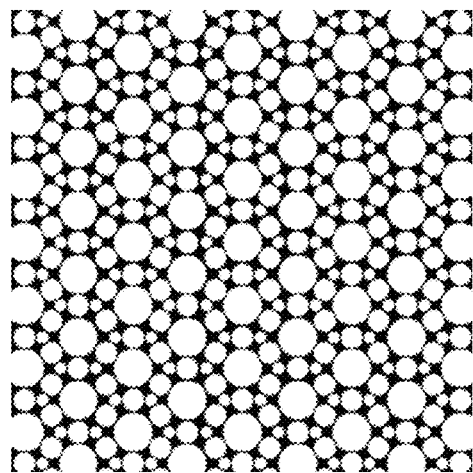
Figure 6D:
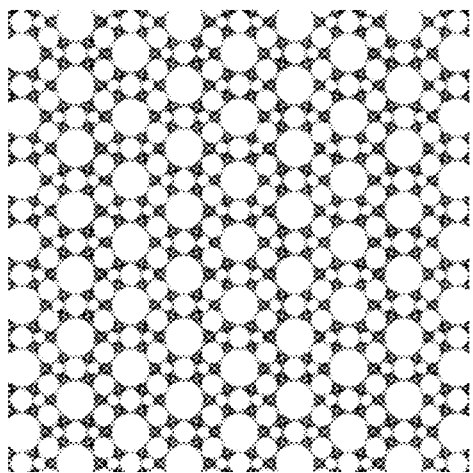

This process of defining cell geometries can be understood in terms of tiling, like putting tiles together on a bathroom floor, where each tile can be the same shape (or different shapes, such as the three different shapes shown), but the pattern on the tiles can vary. FIGS. 6B-6E show examples of a cell geometry and tiling therefor. These examples are shown in two dimensions for ease of understanding. A cell pattern 610 is shown in FIG. 6B, which represents the 2D matrix used for these examples. FIG. 6C shows a 2D sponge geometry 620 created using the cell matrix from FIG. 6B. In addition, the sponge geometry from FIG. 6C is shown again in FIG. 6D with the cell boundaries displayed over it at 630.

Figure 6E:
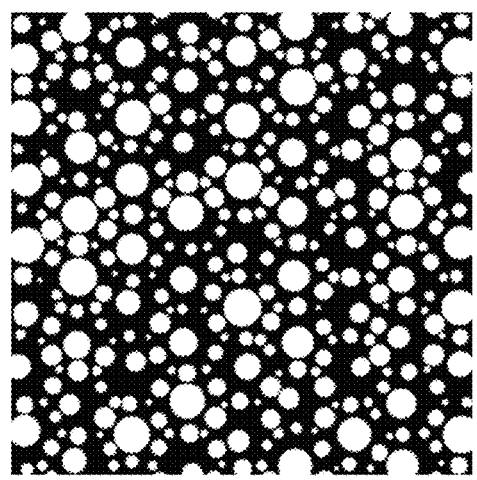
Figure 6F:
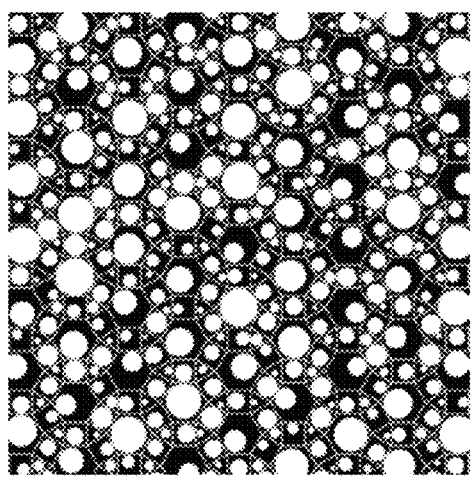

Note that the tile patterns can include different types and shapes of tiles that fit together to fill space, and the cell pattern can include different types of cells both for the same type of tile and for different types of tiles. In addition, random variation can be introduced, such as described in further detail below. For example, FIG. 6E shows a randomized version of the sponge geometry 640, and FIG. 6F shows the randomized sponge with the cell boundaries displayed over it at 650. Note that this example is a simplified version of randomization, where the geometry created in each cell is isolated from the neighboring cells, but more complex randomizations are also possible.

Figure 7:
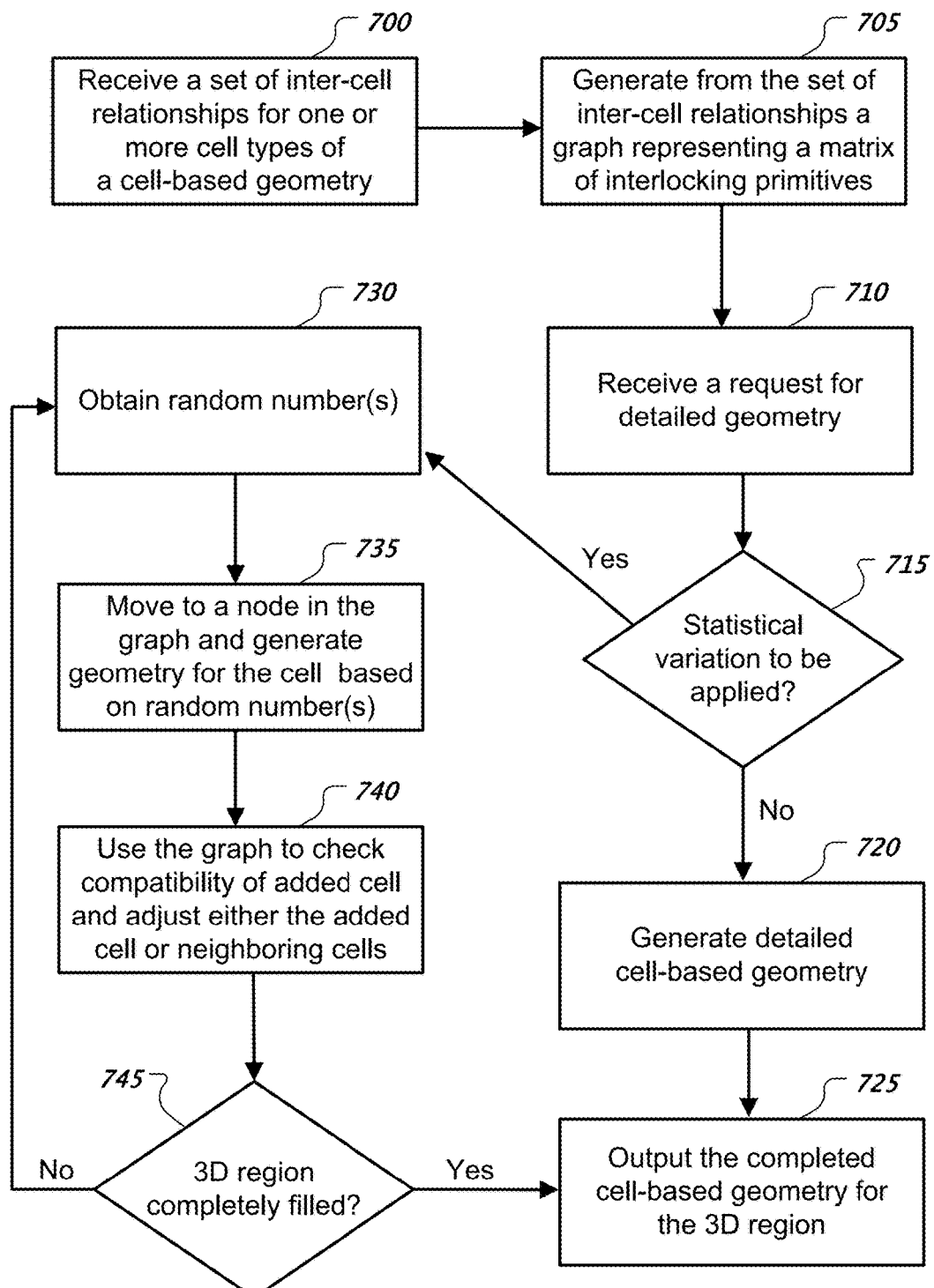
FIG. 7 shows an example of a process to generate a cell-based geometry.

FIG. 7 shows an example of a process to generate a cell-based geometry. At 700, a set of inter-cell relationships are received for one or more cell types of a cell-based geometry. For cell-based generation, the three dimensional geometry can be one or more primitives that interlock when repeated to fill a region. At 705, a graph can be generated from the set of inter-cell relationships representing an association or matrix of these interlocking primitives to form cells. Each node in the graph can represent a primitive instance, including position and orientation information for the primitive instance to define the cell, and each edge between a node and another node in the graph represents a connection between the respective primitive instances. This graph can be the simplified representation of the geometry used to render a simple visual display of the un-generated geometry while the user works on the 3D model, thus providing visual feedback regarding the three dimensional geometry. For example, the graphics hardware can be provided a simple bitmap that is to be displayed over and over again. As another example, the graphics hardware can be provided a group of primitives like triangles and lines, and this group can be instanced in the scene, allowing proper shading and occlusion, etc. Moreover, this graph can also be used to guide the process of full geometry generation later. Thus, the graph can provide context for the geometry generator.

At 710, a request for the detailed geometry is received. As noted above, this can be a user request, or a request generated automatically due to another action, such as a decision to send the 3D model to a 3D printer. At 715, a check can be made as to whether statistical variation is to be applied. This can be an option selected by the user to make the detailed geometry less regular in its structure once generated. Such statistical variation can be applied to a proper subset of the cells of the region, or to all the cells. In any case, at least a portion of cells of a cell type are handled differently during the cell-based generation, such as by generating interlocking primitive instances that are each different from each other even though they are the exact same cell type. These differences can be small or large variations in the dimensions of elements of the cell.

If no statistical variation is desired, the detailed cell-base geometry is generated at 720 in the usual way. This can involve using the graph to guide the generation process. If statistical variation is desired, one or more random numbers are obtained at 730. In some implementations, these are pseudo random numbers generated by the 3D modeling program and passed to the generator. In some implementations, the 3D modeling program can flag that randomness is desired when calling the generator, and the generator can obtain the one or more random numbers itself.

At 735, a next cell can be selected for generation, such as by moving to a next node in the graph. Randomness can be used in the determination regarding which node to go to next, or a regular pattern can be followed. For example, in some implementations, the process can start with a center most node in the graph and move outward systematically. In other implementations, selection of the initial node and subsequent nodes can be made randomly. In addition, a cell for the selected node in the graph is generated at 735 using random number input.

At 740, the new cell is added to the geometry being generated by using the graph to check the compatibility of the cell with one or more neighboring cells. If adjustments are needed, the added cell, the neighboring cell(s), or both can be adjusted to ensure compatibility and a proper final cell geometry. At 745, a check is made as to whether the 3D region is completely filled. If not, the cell generation with statistical variation continues. If so, the completed cell-based geometry for the 3D region is output at 725.

Figure 8:
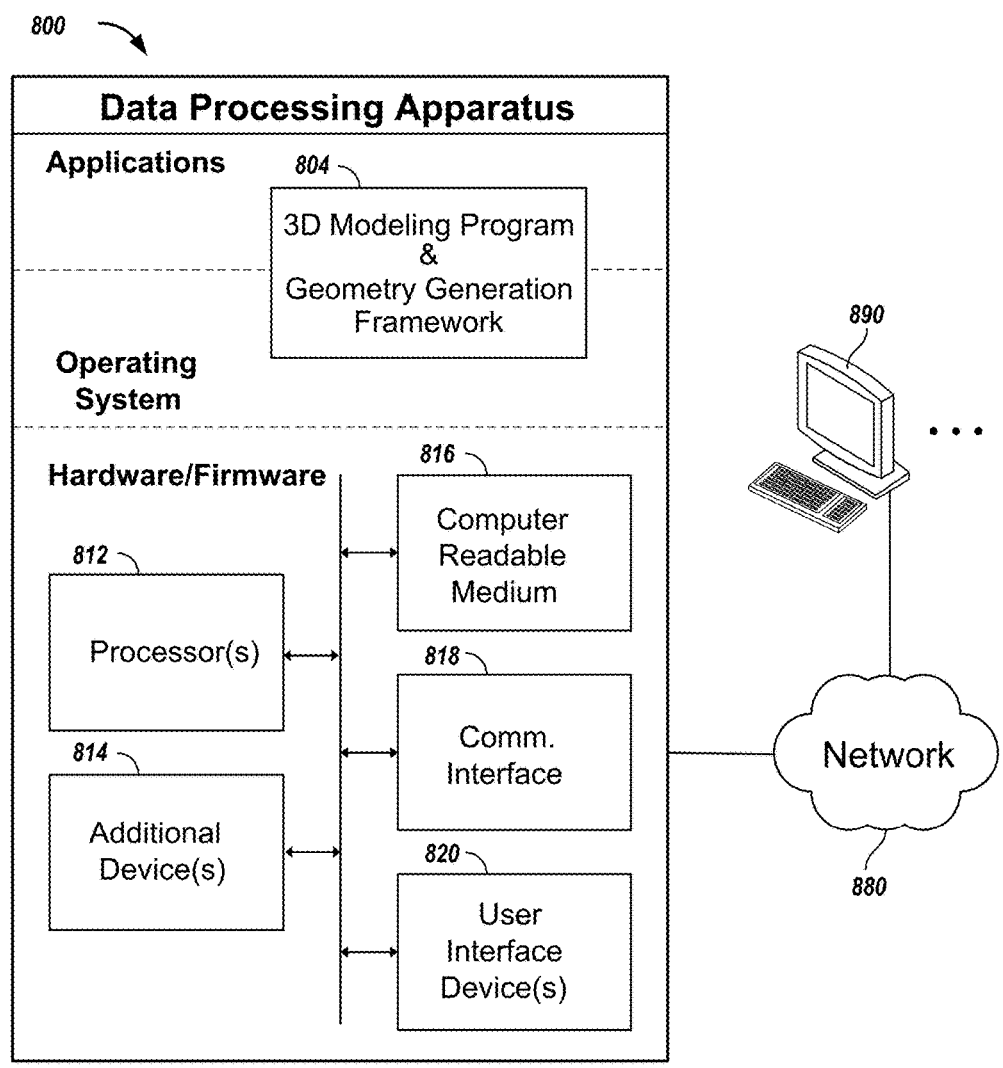
FIG. 8 is a schematic diagram of a data processing system.

FIG. 8 is a schematic diagram of a data processing system including a data processing apparatus 800, which can be programmed as a client or as a server. The data processing apparatus 800 is connected with one or more computers 890 through a network 880. While only one computer is shown in FIG. 8 as the data processing apparatus 800, multiple computers can be used. The data processing apparatus 800 includes various software modules, which can be distributed between an applications layer and an operating system. These can include executable and/or interpretable software programs or libraries, including tools and services of a 3D modeling program and framework 804 for registering and using geometry generators, such as described above. The number of software modules used can vary from one implementation to another. Moreover, the software modules can be distributed on one or more data processing apparatus connected by one or more computer networks or other suitable communication networks.

The data processing apparatus 800 also includes hardware or firmware devices including one or more processors 812, one or more additional devices 814, a computer readable medium 816, a communication interface 818, and one or more user interface devices 820. Each processor 812 is capable of processing instructions for execution within the data processing apparatus 800. In some implementations, the processor 812 is a single or multi-threaded processor. Each processor 812 is capable of processing instructions stored on the computer readable medium 816 or on a storage device such as one of the additional devices 814. The data processing apparatus 800 uses its communication interface 818 to communicate with one or more computers 890, for example, over a network 880. Examples of user interface devices 820 include a display, a camera, a speaker, a microphone, a tactile feedback device, a keyboard, and a mouse. The data processing apparatus 800 can store instructions that implement operations associated with the modules described above, for example, on the computer readable medium 816 or one or more additional devices 814, for example, one or more of a floppy disk device, a hard disk device, an optical disk device, a tape device, and a solid state memory device.

Figure 9:
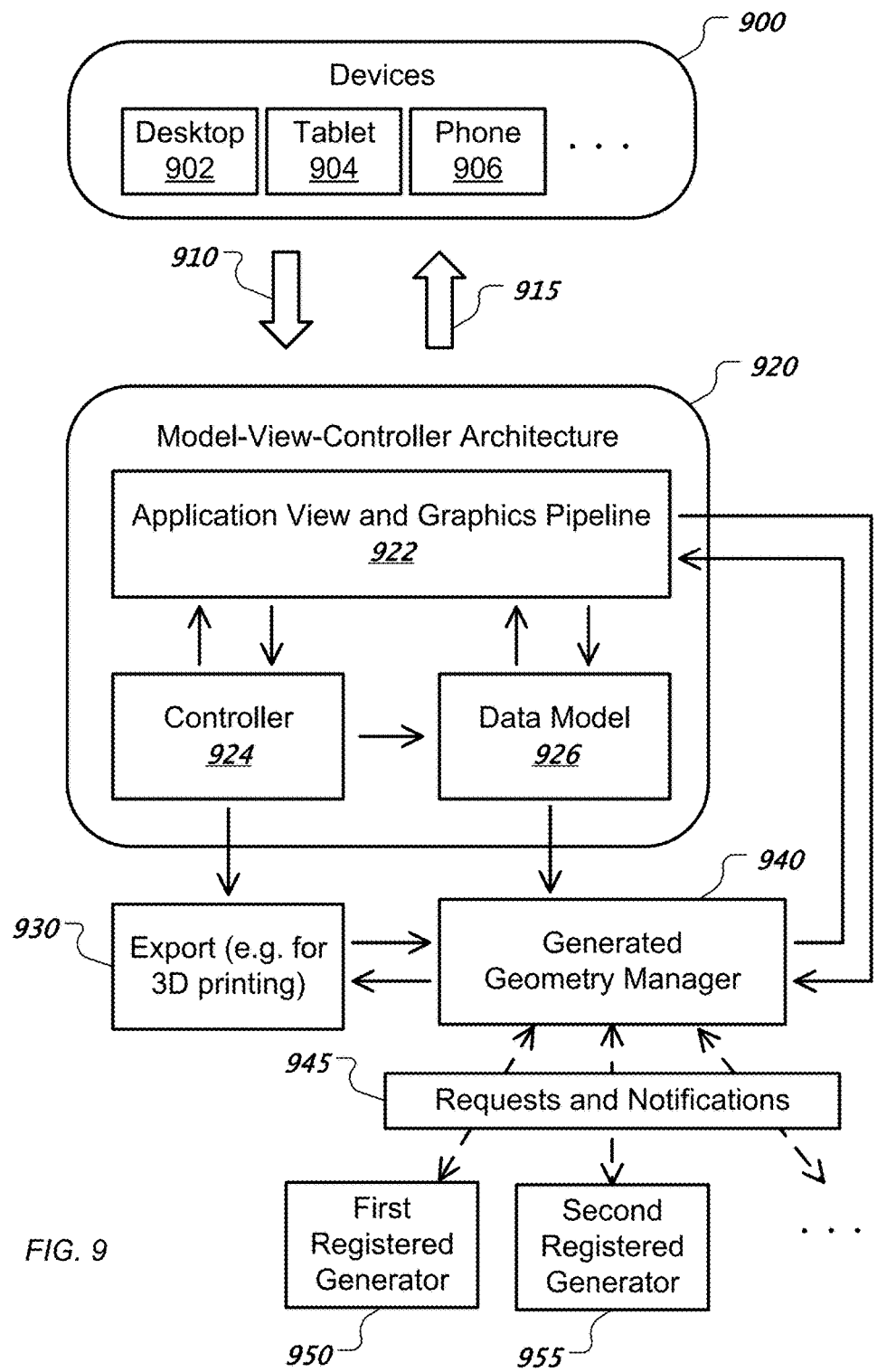
FIG. 9 is a schematic diagram of 3D modeling system architectural framework.

FIG. 9 is a schematic diagram of 3D modeling system architectural framework. Various devices 900 can be included in the framework, including one or more desktop computers 902, one or more tablet computers 904, one or more smart phones 906, and potentially other devices as well. Each such device 900 can provide user input 910 to a model-view-controller architecture 920 and receive back data 915, which can include graphics, views, feedback, etc. The model-view-controller architecture 920 is an example in accordance with some embodiments, and other architectures are also possible.

In general, this diagram gives an overview of how modelling framework for deferred geometry generation can be positioned with respect to other components in a CAD system, and to show the major channels of communication between those components. The model-view-controller architecture 920 includes an application view and graphics pipeline 922, a controller 924, and a data model 926. The model-view-controller architecture 920 can send actions to the controller 924 and receive back updates. The controller 920 can also provide updates to the data model 926. In addition, the model-view-controller architecture 920 can request state information from the data model 926 and receive notifications back from the data model 926.

The data model 926 can notify a generated geometry manager 940 regarding any region changes. The generated geometry manager 940 can likewise send notifications to the application view and graphics pipeline 922 and receive back therefrom a request for generated geometry representation. The generated geometry manager 940 can interact with one or more registered geometry generators, such as a first registered geometry generator 950 and a second registered geometry generator 955, through various requests and notifications 945 to generate geometry representation, full geometry details, or both.

In addition, the controller 924 can communicate with an export module 930 to provide a 3D model to another program or device, such as providing a "water-tight" tessellation of the model from the tessellation of the B-rep and the generated geometry to a 3D printer for 3D printing. The export module 930 can request a combined representation from the generated geometry manager 940, which can in turn interact with one or more registered geometry generators to create full geometry details in the 3D model in a desired output format, and the modified model can be provided to the export module 930.

In some implementations, the controller 924 can also communicate directly with the generated geometry manager 940, e.g., to install new geometry generators, or to query which generators or deformations are available to the user. In some implementations, the generated geometry manager 940 need not communicate directly with the application view and graphics pipeline 922, as shown; rather, the generated geometry manager 940 can keep a simplified version of the generated geometry in the data model 926 (e.g. as triangles) and request new triangles when something has changed. In addition, the use of 3D printing is but one example, and other manufacturing technologies can also be used. For example, such geometry generators can be used in other contexts where a model representation is purpose-built to the machine processing parameters (process type, resolution, etc), and thus a purpose-built representation may provide additional utility.

Moreover, in some implementations, the module 930 can be designed to handle one or more specialized representations of the 3D model. For example, in the case of physical simulation, it be desirable to build an idealized version of the 3D model, where lattices are represented as a data table that the simulation component can reference without geometry being built. Other specialized scenarios are also possible. In general, a service can be provided for each application where the primary model is to be married to (combined with) the generated geometry in a way that is useful for some purpose.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the embodiments are described in the context of using a boundary representation model, but other model paradigms can be used, such as constructive solid geometry (CSG) representation. In addition, the actions recited in the claims can be performed in a different order and still achieve desirable results.

What is claimed is:

1. A method performed by a three dimensional (3D) modeling program on a computer comprising a processor and a memory, the method comprising:
   obtaining input to define a boundary of a three dimensional envelope for a 3D model of an object, wherein the 3D model uses one or more boundary representations to define the object in the 3D model;
   identifying a geometry type for the three dimensional envelope, wherein the geometry type has an associated three dimensional geometry used to create geometry details for the three dimensional envelope within the 3D model;
   manipulating the 3D model in response to input that changes at least one aspect of the three dimensional envelope, while deferring generation of the geometry details for the three dimensional envelope within the 3D model; and
   rendering the 3D model on a display screen, including rendering a simplified representation of the three dimensional geometry within the changed three dimensional envelope.

2. The method of claim 1, wherein the 3D model comprises a collection of surface elements that define at least a portion of the object, and the method comprises:
   receiving further input indicating the geometry details for the three dimensional envelope should be created; and
   generating, in response to the further input, surface elements defining the geometry details for the three dimensional envelope in accordance with the three dimensional geometry.

3. The method of claim 2, comprising storing the 3D model, including one or more parameters useable to regenerate the geometry details, without storing the surface elements defining the geometry details for the three dimensional envelope.

4. The method of claim 2, wherein identifying the geometry type comprises receiving a selection of a registered geometry generator, and generating the surface elements defining the geometry details comprises calling the registered geometry generator to generate the surface elements defining the geometry details.

5. The method of claim 4, comprising notifying the registered geometry generator of changes with respect to the three dimensional envelope.

6. The method of claim 4, wherein the registered geometry generator provides an indication of whether the registered geometry generator can apply a deformation within the three dimensional envelope.

7. The method of claim 4, comprising:
   deforming the boundary of the three dimensional envelope by an inverse of a deformation to be applied within the three dimensional envelope;
   sending the inverse deformed boundary to the registered geometry generator;
   receiving from the registered geometry generator the surface elements defining the geometry details within the inverse deformed boundary; and
   deforming the surface elements defining the geometry details within the inverse deformed boundary by the deformation.

8. The method of claim 2, wherein generating the surface elements defining the geometry details comprises employing cell-based generation, and the three dimensional geometry comprises one or more primitives that interlock when repeated to fill a region.

9. The method of claim 8, wherein at least a portion of cells of a cell type are handled differently during the cell-based generation, including generating interlocking primitive instances that are each different from each other for the at least a portion of the cells of the cell type.

10. The method of claim 9, wherein the simplified representation of the three dimensional geometry comprises a graph representing an association of interlocking primitives, wherein a node in the graph represents a primitive instance, including position and orientation information for the primitive instance, and an edge between the node and another node in the graph represents a connection between respective primitive instances.

11. The method of claim 8, wherein rendering the simplified representation comprises creating a visual display based on the three dimensional envelope to provide visual feedback regarding the simplified representation of the three dimensional geometry within the changed three dimensional envelope.

12. The method of claim 2, comprising outputting the 3D model, including the surface elements defining the geometry details, to a three dimensional printer for printing.

13. The method of claim 2, wherein the three dimensional geometry comprises a lattice comprising a set of junctions and a set of beams connecting the junctions.

14. The method of claim 13, comprising receiving modifying data to be applied to one or more of the junctions, one or more of the beams, or both, during the generating.

15. A system comprising:
   a non-transitory storage medium having instructions of a three dimensional (3D) modeling program stored thereon; and
   one or more data processing apparatus configured to run the instructions of the 3D modeling program to (i) receive a registration of a geometry generator, (ii) obtain input defining a 3D model and a three dimensional envelope associated with the 3D model and with the geometry generator, and (iii) use the geometry generator to create geometry details for the three dimensional envelope after creation, manipulation, and rendering of the 3D model with the associated three dimensional envelope to a display screen while deferring generation of the geometry details for the three dimensional envelope.

16. The system of claim 15, wherein the one or more data processing apparatus are configured to run the instructions of the 3D modeling program to create an accurate representation of a combination of the 3D model and the geometry details generated for the three dimensional envelope for provision to a 3D printer.

17. The system of claim 15, wherein the one or more data processing apparatus are configured to run the instructions of the 3D modeling program to store the 3D model and parameters useable to regenerate the geometry details using the geometry generator, without storing surface elements defining the geometry details for the three dimensional envelope.

18. The system of claim 15, wherein the geometry generator provides an indication of whether the geometry generator can apply a deformation within the three dimensional envelope.

19. The system of claim 15, wherein the one or more data processing apparatus are configured to run the instructions of the 3D modeling program to deform the boundary of the three dimensional envelope by an inverse of a deformation to be applied within the three dimensional envelope, send the inverse deformed boundary to the geometry generator, receive from the geometry generator the surface elements defining the geometry details within the inverse deformed boundary, and deform the surface elements defining the geometry details within the inverse deformed boundary by the deformation.

20. The system of claim 15, wherein the geometry generator is one of multiple geometry generators available in the system, at least one of the multiple geometry generators employs cell-based generation, and at least one of the multiple geometry generators employs lattice-based generation.

21. The system of claim 20, wherein the geometry generator employs cell-based generation, and cells are defined by the geometry generator in a library of cell configurations.

* * * * *